Aug. 11, 1925.

B. E. HANEY

LAWN WEEDER

Filed Feb. 8, 1923

1,549,198

B. E. Haney, Inventor

By C. A. Snow & Co.
Attorneys

Patented Aug. 11, 1925.

1,549,198

UNITED STATES PATENT OFFICE.

BURTON E. HANEY, OF PORTLAND, OREGON.

LAWN WEEDER.

Application filed February 8, 1923. Serial No. 617,802.

*To all whom it may concern:*

Be it known that I, BURTON E. HANEY, a citizen of the United States, residing at Portland, in the county of Multnomah and State of Oregon, have invented a new and useful Lawn Weeder, of which the following is a specification.

This invention aims to provide a simple means whereby weeds may be removed from a lawn and the invention aims, especially to improve the construction of the prongs which are engaged about the weeds and to improve the construction of the ejector whereby the weed and the earth are detached form the prongs.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
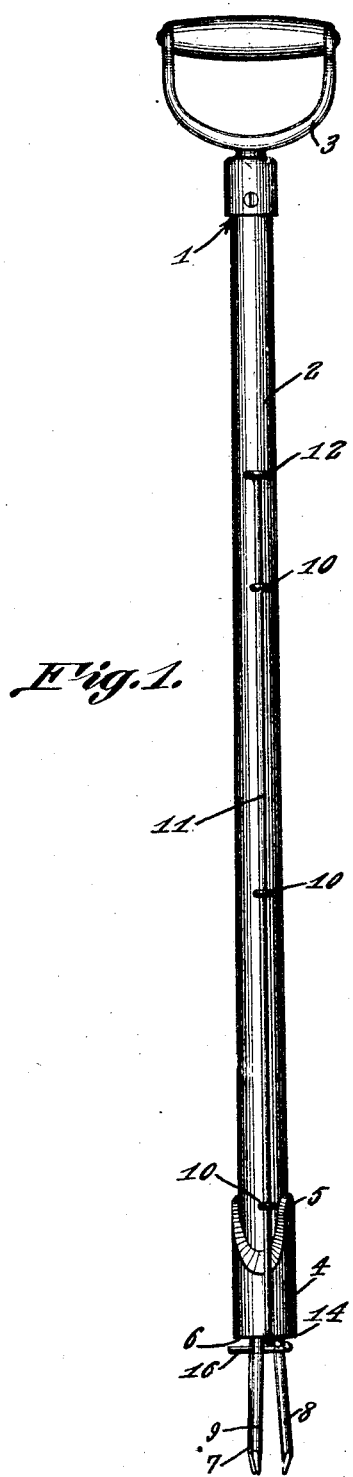
Figure 2:
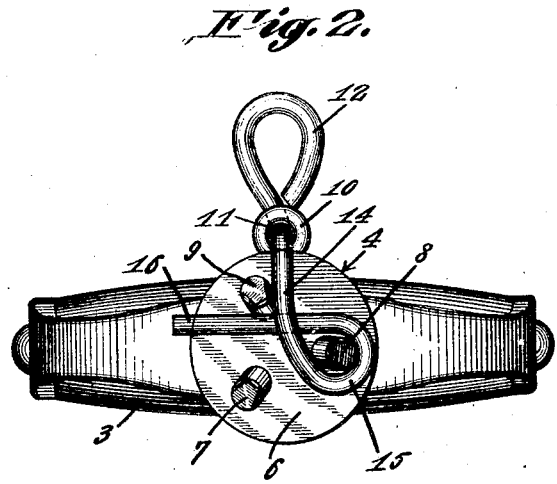

Figure 1 shows in elevation a device constructed in accordance with the invention; Figure 2 is an end elevation.

The device forming the subject matter of this application comprises a staff, denoted generally by the numeral 1, the staff including a bar 2, a handle 3 being attached to the upper end of the bar. The lower end of the bar 2 is received in a socket 4 and is held therein by one or more securing elements 5, the socket including an end wall 6 wherein any desired number of downwardly diverging pointed prongs 7, 8 and 9 are securely mounted. Guides 10 are located on the bar 2, and in the guides 10 a slide 11, preferably in the from of a rod is mounted for reciprocation, the slide being supplied at its upper end with an outstanding loop-shaped finger piece 12. The slide 11 is supplied at its lower end with an inwardly extended arm 14 merging into an eye 15 forming an opening receiving the prong 8, the eye 15 being continued to fashion a finger 16, disposed approximately at right angles to the arm 14 and slidable between the prongs 7 and 9.

The device, in the form shown in Figure 1 is thrust downwardly, the prongs 7, 8 and 9 entering the earth about the weed which is to be removed. Owing to the fact that the prongs 7, 8 and 9 diverge as they extend downwardly, the earth about the weed is wedged and held securely between the prongs. When the staff 1 is rotated by means of the handle 3, the earth will be cut by the prongs 7, 8 and 9 a conical section of earth containing the weed being held securely between the prongs. After the staff 1 has been lifted, the slide 11 may be moved downwardly, by means of the finger piece 12, and the ejector, comprising the elements 14, 15 and 16, will detach the earth and the weed from the prongs 7, 8 and 9. The prong 8, cooperating with the eye 15 serves to guide the ejector and owing to the fact that the finger 16 extends between the prongs 7 and 9, as shown in Figure 2, the ejector will have an extended bearing on the mass of earth and will serve to detach the earth and the weed from the prongs. Referring to the drawings, it will be observed that the finger 16 projects beyond the periphery of the staff, so that the projecting end of the finger may be used as a foot piece, to operate the ejector, should the operation call for the expenditure of more effort than can be applied at the part 12.

What is claimed is:—

A device of the class described comprising a staff provided at its lower end with a plurality of prongs and a slide mounted for reciprocation on the staff, the slide being bent upon itself to form a point of crossing and to form an eye carried for reciprocation on one of the prongs, the eye being extended to form a free ended finger prolonged between others of the prongs, and beyond the periphery of the staff to constitute a foot piece, the eye and the finger constituting an ejector, the prongs being set inwardly from the periphery of the staff far enough so that said point of crossing will be located near to the prolonged geometrical center of the staff.

In testimony that I claim the foregoing as my own, I have hereto affixed my signature in the presence of two witnesses.

BURTON E. HANEY.

Witnesses:
 HERMAN G. KING,
 DALIA KING.